(No Model.)

G. W. STACY.
CULTIVATOR.

No. 285,318. Patented Sept. 18, 1883.

WITNESSES:
Thos. Houghton.
W. K. Stevens

INVENTOR:
Geo. W. Stacy
BY Munn & Co
ATTORNEYS.

UNITED STATES PATENT OFFICE.

GEORGE W. STACY, OF MARIETTA, MISSISSIPPI.

CULTIVATOR.

SPECIFICATION forming part of Letters Patent No. 285,318, dated September 18, 1883.

Application filed May 10, 1883. (No model.)

*To all whom it may concern:*

Be it known that I, GEORGE W. STACY, a citizen of the United States, residing at Marietta, in the county of Prentiss and State of Mississippi, have invented a new and Improved Cultivator, of which the following is a specification.

My invention relates to that class of cultivators known as "straddle-row cultivators;" and it has for its object to provide means whereby the same cultivator is adapted to work as either a straddle-row or a mid-row cultivator, or to cut the roots of small sprouts, briers, &c.

To this end it consists in the construction and combination of parts hereinafter described and claimed, reference being had to the accompanying drawings, in which—

Figure 1:
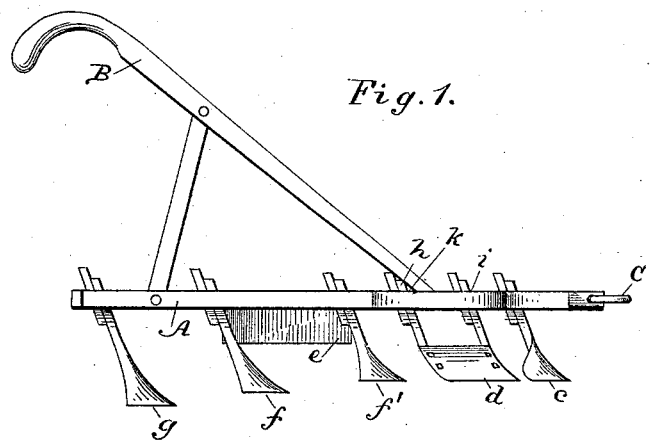
Figure 2:
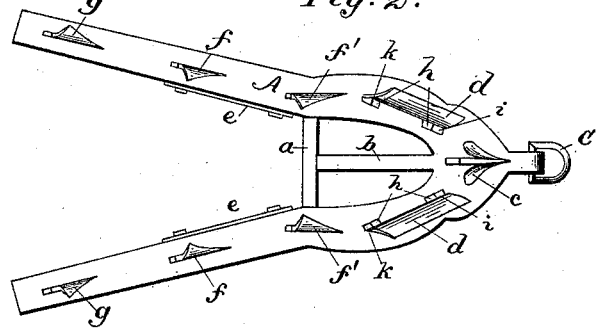

Figure 1 is a side elevation, and Fig. 2 is an inverted plan view, of my improved cultivator.

A represents the two side beams of the cultivator, converging and joining at their forward ends upon a central draft-bar, b. a is a cross-bar connecting the side beams and having the draft-bar attached to it. These four parts are rigidly bolted together, forming the frame of the cultivator, which is provided with the usual handles, B, by which the cultivator is guided, and the usual clevis, C, by which it is drawn. The forward portion of the side beams, A, is curved outward, as shown in Fig. 2, for the purpose of holding the plows and scrapers in the positions relative to each other which I have established in order to accomplish the desired result. The forward plow, c, is a regular two-shared shovel-plow, intended for use in connection with other plows attached to the cultivator when it is used as a mid-row cultivator, and this plow will be removed from the cultivator to adapt the same for use straddling the rows. The holes in the beams A for the next two shanks, h, stand in lines converging to a point near the front end of the cultivator, in order that they may receive either the shanks of the scrapers d, two of said shanks being secured in line to each scraper, or the shanks of independent plows. The scrapers d, or plows in their places, will be set to turn the dirt away from the plants. The next two plows, f f', on each side turn the dirt toward the plants, and the fenders e prevent clods or high bunches of dirt being turned onto the plants. The last plow, g, on each side is set to turn the dirt outward. The shank-holes of the central plows, f', are parallel to the line of travel and to each other, and these plows greatly assist in guiding the cultivator in line. The next two plows, f and g, stand in line of their respective beams. The hole for plow f' is directly behind the rear hole h, so that when two plows are used in the holes h on each side the rear one will form a furrow in which plow f' follows, but the two turn the dirt in opposite directions. Thus the first two plows, or the scraper d in their stead, will cut up weeds close to the plants and turn them away, then plows f turn sufficient earth toward the plants to form a proper row-hill, and at the same time they make water-gutters near the roots, while the rear or wing plows, f and g, turning the earth in opposite directions to each other, cultivate the mid-row ground.

The fender-plates e are each provided with two vertical slots, in which bolts are placed to hold them to the beams and to adjust their height as may be desired. The holes in the beams for all the plow-shanks are elongated to permit the plows to be brought nearer together or farther apart fore and aft by placing the wedging-keys before or behind the shanks.

The scrapers d are cylindrical arcs of plate-steel, sharp at their front edges and fastened to their shanks by bolts, in order that they may be removed therefrom to be ground, as it is desired to keep their edges sufficiently sharp to cut small roots of briers, sprouts, &c., under ground. The shanks and holes all being uniform, the plows are interchangeable; and they may be arranged to face as desired, either when used in connection with the point-plow c or without it.

When separate plows are used in each of the holes i i and k k, the plows in the holes i and the plows f' may be all of one length, the plows in holes k and the plows f may be a little longer, and the last pair, g, may be longer still. The object of this arrangement is to cause all of the plows to penetrate the earth to about an equal depth, those forward and near the center running on top of the hill, and each pair located farther from a central line running on the slanting sides of the hill and in the hollows, being of lengths proportional to the form of the hill.

The handles may be adapted to a single central beam braced by irons extending to the side beams.

I am aware that cultivators having scrapers to throw earth both to and from the hill are not new, and I do not claim the same, broadly.

What I claim as my invention, and wish to secure by Letters Patent, is—

The combination, with the curved beams A and the single plows $f'\ f\ g$, of the sharp-edged scrapers $d$, each removably secured to two shanks adapted to be held in the holes $h$, as and for the purpose specified.

GEORGE W. STACY.

Witnesses:
B. A. P. SELMAN,
G. W. COLLINS.